United States Patent [19]

Sterrett et al.

[11] 4,184,089

[45] Jan. 15, 1980

[54] MULTIPLE PLANE SPOKE STRUCTURE FOR A SUPERCONDUCTING DYNAMOELECTRIC MACHINE

[75] Inventors: Charles C. Sterrett, Penn Hills Township, Allegheny County; John H. Murphy, Wilkins Township, Allegheny County, both of Pa.

[73] Assignee: Westinghouse Electric Corp., Pittsburgh, Pa.

[21] Appl. No.: 658,949

[22] Filed: Feb. 18, 1976

[51] Int. Cl.$^2$ ............................................. H02K 9/00
[52] U.S. Cl. ...................................... 310/52; 310/91; 310/261
[58] Field of Search ..................... 310/10, 61, 40, 114, 310/52, 91, 112, 261, 262, 264, 265, 266

[56] References Cited

U.S. PATENT DOCUMENTS

| T914,004 | 9/1973 | Litz | 310/52 |
| 3,368,087 | 2/1968 | Madsen | 310/52 |
| 3,816,780 | 6/1974 | Smith | 310/52 |
| 3,942,053 | 3/1976 | Abolins | 310/10 |
| 4,060,742 | 11/1977 | Litz | 310/52 |

Primary Examiner—R. Skudy
Attorney, Agent, or Firm—G. H. Telfer

[57] ABSTRACT

A multiple plane spoke structure for supporting a superconducting rotor assembly of a dynamoelectric machine. A plurality of generally radially extending support spokes interconnect an ambient temperature rotor portion with a cryogenic temperature rotor portion. The spokes are secured in tension between the two rotor portions and are displaced one from another along the axial length of the rotor member. The spokes are preferably grouped together in sets of at least two each with at least one of the spokes being angularly displaced with respect to the remaining spokes. The proper placement of these groups of spokes is determined by comparing the maximum deflection of the rotor assembly at the operational frequency to the maximum allowable deflection which can be tolerated under steady state conditions. Each spoke projects through radial openings in the core of the field winding structure. These openings are preferably located in the pole portions of the rotor core structure which lie intermediate of next adjacent field winding groups.

9 Claims, 6 Drawing Figures

MULTIPLE PLANE SPOKE STRUCTURE FOR A SUPERCONDUCTING DYNAMOELECTRIC MACHINE

BACKGROUND OF THE INVENTION

1. Field of the Invention

This invention relates generally to superconducting dynamoelectric machines, and more specifically, this invention relates to a superconducting dynamoelectric machine having an improved arrangement for supporting a cryogenic temperature portion of the rotor on an ambient temperature portion of the rotor.

2. Description of the Prior Art

Superconducting dynamoelectric machinery having a rotating superconductive field winding requires a stable support for the cryogenic portion of the rotor, while still limiting heat conduction from the ambient temperature portion of the rotor to the greatest extent possible. In prior art cryogenic structures (Dewar vessels), an outer ambient temperature structure has a fill tube passing through it to convey the cryogenic material to an inner cryogenic temperature portion. The fill tube is affixed to the ambient temperature structure to provide support for the cryogenic temperature portion. In addition, thin wires or spokes are utilized to help support the cryogenic temperature portion. The cryogenic temperature portion is surrounded by a vacuum to eliminate convection losses and the surfaces of the inner and outer walls are highly polished to lower radiation losses. Heat conduction to the cryogenic temperature portion is directly proportional to the cross-sectional area divided by the length of the supports linking the ambient temperature and cryogenic temperature portions. Long thin supports are therefore used to reduce conduction losses, which would otherwise result in excessive "boil off" of the cryogenic material.

However, in a stationary Dewar vessel the supporting structure is only required to support the weight of the assembly and is not required to provide precision placement of the cryogenic temperature portion with respect to the ambient temperature portion. On the other hand, in a rotating Dewar assembly, such as a cryogenic portion of the superconducting machine rotor, the cryogenic temperature portion must be supported for static and dynamic loads. The superconducting field winding located in the cryogenic temperature portion may have a significant mass. Thus, the supporting arrangement for the cryogenic temperature portion must: transmit machine torque from the field winding to the prime mover; maintain the concentricity of the ambient temperature and cryogenic temperature portions; absorb axial thermal distortion; and, limit heat losses to the cryogenic temperature portion. One way to accomplish this is to use a tubular support for one end of the cryogenic temperature portion to provide torque transmittal capability, while the other end is supported by spokes to absorb axial thermal distortion and limit heat losses. The use of such a spoke supporting structure is illustrated, for example, in a copending application of D. C. Litz, Ser. No. 398,023, filed Sept. 17, 1973 now a Defensive Publication No. T 934,001 and assigned to the assignee of the present invention.

This supporting structure has been entirely satisfactory for rotors of relatively small size, that is, rotor structures having a ratio of length to diameter less than 5:1. When the ratio of the length to the diameter of the rotor assembly approaches or exceeds the ratio 5:1, the rotor body becomes quite flexible. This means that, as a result of its own weight, the body of the rotor is caused to sag or deflect downwardly, thus causing a relatively large downward curvature of the body. This large curvature in the body of the rotor, in combination with the variable moment of inertia of an area at right angles to the rotor body that is caused by the non-uniform density of the superconducting structure, causes two very serious modes of vibration to occur as the rotor is brought up to normal operating speed or as it is allowed to slow down to a standstill. One of these very serious modes of vibration takes place in a frequency range that substantially coincides with the frequency range of a main critical speed of the entire turbine generator, the speed being a speed in which the frequency of the whirling force is in resonance with a natural frequency vibration of the rotor assembly. The other serious mode of vibration takes place at a frequency which is substantially one-half of the main critical speed.

The entire support structure for the superconducting rotor assembly must be designed to have its resonances or critical speeds far enough removed from operating speed so that minimal shaft vibration occurs. This is particularly important for a cryogenic rotor for several reasons. Any vibrational energy produced in the rotor cold zone or surrounding structure will result in heat which must be removed by the refrigeration system. If excessive heat is produced, even momentarily, field quenching may occur. Secondly, the helium transfer system coupled to the exciter end of the rotor must run with extremely low vibration. Additionally, the physical air gap between the rotor member and the stator member will tend to be much smaller than on conventional machines. It is desirable, therefore, to provide a supporting structure for the cryogenic portion of the rotor so that it will operate either below the first critical speed or at a point intermediate of the first and second critical speeds. Such a structure should be adjustable so that the rotor member will not operate "close" to either critical point so that the maximum deflection of the rotor portion at the operational frequency does not exceed the maximum allowable deflection which can be tolerated under steady state conditions.

SUMMARY OF THE INVENTION

In order to properly mount the cryogenic temperature portion of a rotor member, a supporting arrangement meeting the following requirements is provided by the present invention: (1) sufficient strength to prevent relative motion between the ambient temperature and cryogenic temperature portions which would cause high imbalance forces; (2) limited heat conduction between the ambient temperature and cryogenic temperature portions which would otherwise cause excessive "boil off" of the cryogen; (3) fine adjustment of the relative positioning of the ambient temperature and cryogenic temperature portions is provided in order to align respective centers of rotation for good dynamic balance; and, (4) provide increased flexural rigidity of the cryogenic temperature portion of the rotor member, the first and second critical whirling speeds of the rotor member being shifted sufficiently so that the rotor operating speed is either below the first critical whirling speed or is between the first and second critical speeds and is not close to either critical point to ensure that the maximum deflection of the rotor at the operational frequency does not exceed the maximum allowable deflection which can be tolerated under steady state conditions.

To meet the foregoing requirements, an improved superconducting dynamoelectric machine is provided. This machine has a conventional stator, while the rotor has an improved arrangement for supporting a cryogenic temperature portion on an ambient temperature portion. Although this description is undertaken with respect to the rotor of a superconducting dynamoelectric machine, it should be recognized that the invention is equally applicable to any situation in which it is desired to securely and accurately mount a cryogenic temperature portion while minimizing heat losses.

In the improved supporting arrangement, the ambient temperature rotor portion is connected to the cryogenic temperature rotor portion by a plurality of relatively long and thin support spokes. Each of the support spokes has one end fixed to the ambient temperature portion by a ball and socket arrangement and the other end fixed to the cryogenic temperature portion by a ball and socket arrangement. Each spoke is divided into two threaded portions and are joined together by means of a threaded connector to provide the proper tension for each spoke.

The rotor member includes a generally cylindrical first rotor portion which is adapted for ambient temperature operation, and a generally cylindrical second rotor portion which is adapted for a cryogenic temperature operation. The cryogenic second rotor portion includes a rotor core member in a superconducting winding, the winding being wound about the core member with portions of the core member disposed intermediate of next adjacent winding portions. A plurality of the support spokes project through the intermediate core portions to interconnect the first and second rotor portions. The spokes are displaced one from another along the axial length of the rotor member, and are preferably distributed in axially spaced groups. The spokes within each group are spaced apart axially with at least one of the spokes being angularly displaced with respect to the remaining ones within the group. The axial spacing distance between the support spokes within each group is small as compared to the axial spacing distance between the groups so that the spokes appear to be arranged in planar groups.

In a preferred embodiment of the invention, the cryogenic temperature rotor portion comprises a generally cylindrical core member and a superconductive winding including a plurality of turns distributed in winding groups about the cylindrical core member. The winding groups define at least one magnetic pole pair with the core member having core pole portions disposed intermediate of the next adjacent winding groups. The pole portions have radially extending openings through which the support spokes project. The superconducting winding may be disposed within a plurality of radially extending, circumferentially spaced slots with the spokes projecting between the slotted winding groups, or, the intermediate core pole portions may be salient poles and the winding may be wound about the salient pole portions with the spokes projecting through openings which extend radially through the salient poles.

Since multiple "planar" supporting spoke groups may be distributed along the length of the rotor, the critical frequencies may be "tuned" to cause a shift in the rotor deflection-frequency curves, so that the operating speed will lie approximately midway between the consecutive critical frequencies or so that the first critical speed is shifted far enough away so that the rotor will operate well below the first critical speed, in either case, minimizing the rotor deflection and operating speed. Although the introduction of a plurality of spokes along the cryogenic rotor portion tends to increase the heat loss to the ambient temperature portion, this loss is minimized in the present invention by exhausting the cryogenic cooling fluid through the pole openings and over the spokes. With this structural arrangement, the thermal loading of multiple spokes is limited to an acceptable value, and the disadvantage of slightly larger refrigeration capacity to accommodate the slightly larger thermal load is more than offset by the substantial reduction in rotor vibration.

The foregoing and other objects, advantages and features of this invention will hereinafter appear, and for purposes of illustration, but of limitation, an exemplary embodiment of the subject invention is shown in the appended drawing.

DESCRIPTION OF THE PREFERRED EMBODIMENT

Figure 1:
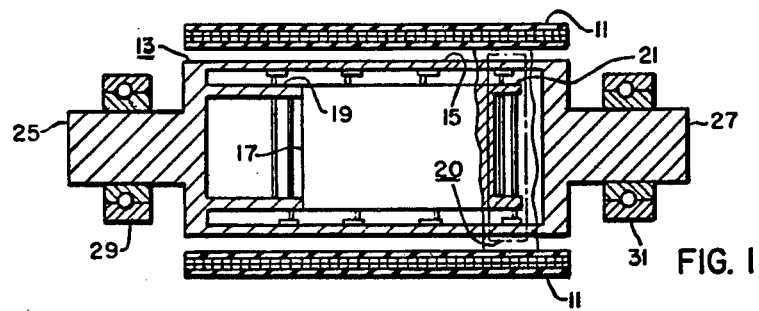
FIG. 1 is a schematic axial cross-sectional view of a superconducting dynamoelectric machine constructed in accordance with the present invention.

In FIG. 1 of the drawing there is illustrated a superconducting dynamoelectric machine having a generally cylindrical stator 11. A rotor 13 has a generally cylindrical portion 15 adapted for ambient temperature operation and a generally cylindrical portion 17 adapted for cryogenic temperature operation. One end of the cryogenic portion 17 is supported on the ambient portion 15 by a generally cylindrical annulus, or tubular structure 19. The tubular structure 19 is sufficiently strong to transmit machine torque from a prime mover (not shown) to the cryogenic portion 17. The other end of the cryogenic temperature rotor portion 17 is connected to the ambient temperature portion 15 by a supporting arrangement 20. The supporting arrangement 20 includes a generally cylindrical flange or ring 21 that is attached to the end of the cryogenic temperature portion 17 away from the tubular support 19. Support spokes 23 interconnect the flange or ring 21 with the ambient temperature portion 15 of the rotor 13.

The ambient temperature portion 15 of the rotor 13 has shafts 25 and 27 affixed to the ends thereof. Shafts 25 and 27 ride on bearing assemblies 29 and 31, respectively to support the rotor 13. The spoke supporting arrangement is illustrated in greater detail in FIGS. 2 and 3 of the drawing. The support spokes 23 are relatively long and thin, with the design representing a compromise between the required stiffness and the allowable heat loss. Each of the support spokes 23 includes a first spoke section 33 and a second spoke section 35. One end of the spoke section 33 is secured to an area 37 of the ambient temperature rotor portion 15 by a ball and socket arrangement 39. The ball and socket arrangement 39 permits some pivoting of this end of the spoke 23 when there is movement of the other end of the spoke, such as by contraction in the direction along the axis of the machine. A passage 41 through the area 37 and a passage 43 through the rotor core member are appropriately constructed so as not to interfere with such motion of the spoke 23.

One end of the spoke section 35 is similarly affixed to a rotor core portion 44 by a ball and socket arrangement 45. A passage 47 through the core 44 is appropriately designed to prevent binding of section 35 as a result of movement of the ball and socket arrangements during axial movement of the cryogenic rotor portion relative to the ambient rotor portion.

The other ends of the spoke sections 33 and 35 are provided with threads 49 and 51, respectively. An adjusting nut 53 is threaded and engages both the threads 49 and 51 to adjust the tension in the spoke and to align the cryogenic temperature portion 17 with respect to the ambient temperature rotor portion 15. After the proper alignment has been achieved, the adjusting nuts are tightened uniformly to set the desired tension in the spokes 23.

The number of spokes 23 in each group may be varied as required or desired for particular application. However, in the superconducting dynamoelectric machine application of this preferred embodiment it is desired to utilize at least two pairs of such spokes, the pairs being angularly displaced at right angles with respect to each other, in order to achieve the desired precision and the alignment of the ambient temperature portion 15 in the cryogenic temperature portion 17 of the rotor.

Figure 3:
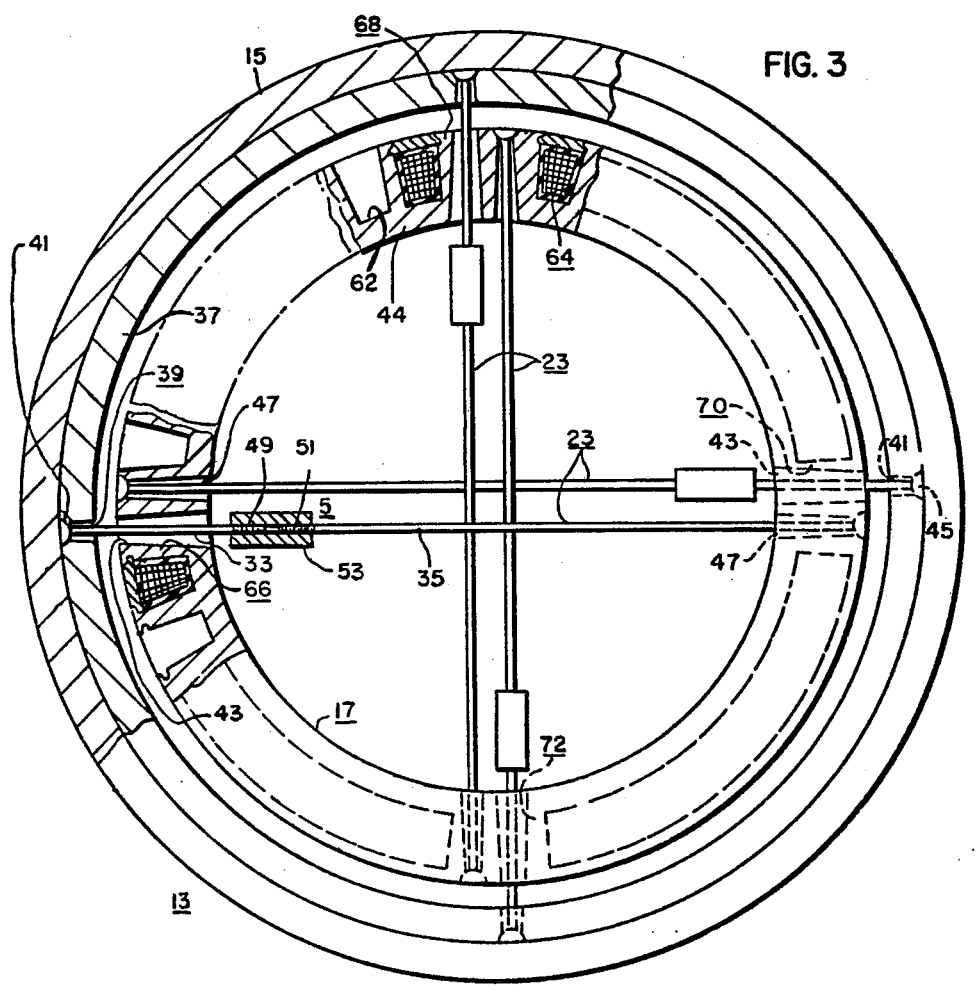
FIG. 3 is a cross-sectional view of the rotor assembly of FIG. 2 taken along the line III—III.

In order to provide increased flexural rigidity for the cryogenic temperature rotor portion 17, the spokes 23 are formed in sets and are spaced along the axial length of the rotor portion 17. Each of the sets in this preferred embodiment, incorporates at least four spokes 23, for the reason indicated above. FIG. 3 illustrates the utilization of four spokes in one such set. In order to offset the torque reaction caused by the axial displacement of the sets of spokes, the spokes in each succeeding set should be angularly displaced relative to the corresponding spokes in the preceding set. In this fashion, the desired additional stiffness may be obtained without an adverse torque reaction resulting from the axial displacement of the spoke sets.

Figure 2:
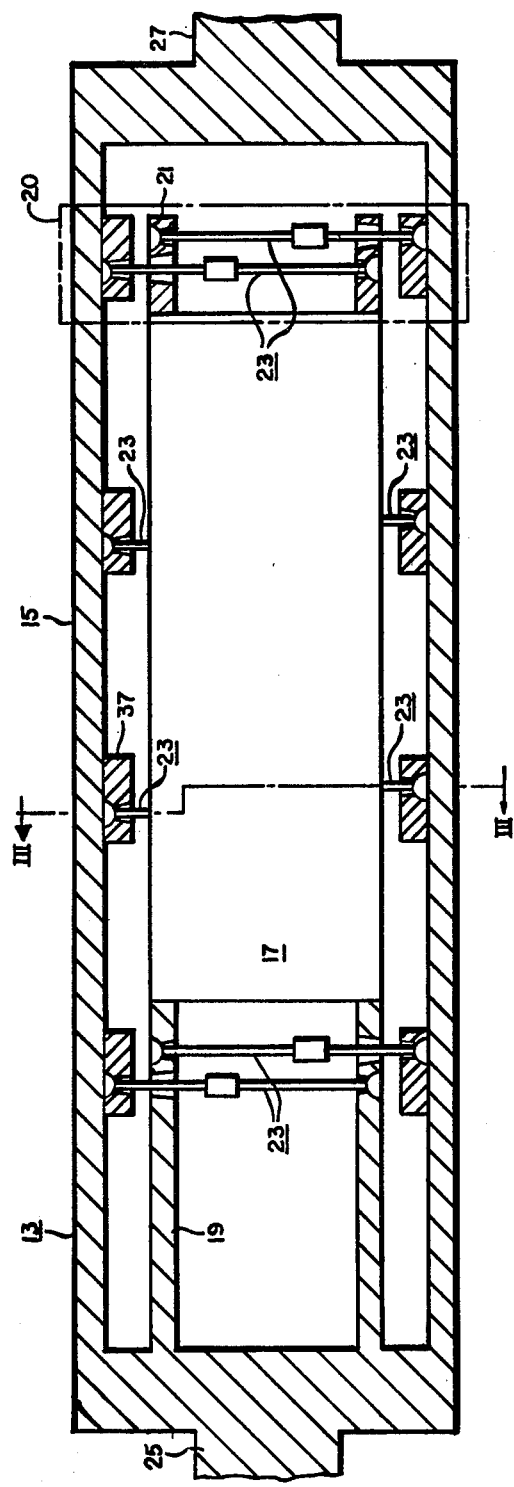
FIG. 2 is an enlarged view, partly in section, of the rotor assembly of the dynamoelectric machine of FIG. 1.

Referring now to FIG. 2, the cryogenic rotor portion 17 is supported at one end by the torque tube 19 which is rigidly secured to one end of the ambient temperature rotor portion 13 and the other end is supported by the spokes 23 which project through the flange 21. Disposed intermediate of the torque tube 19 and the flange 21 are three axially spaced sets of supporting spokes 23. The flexural rigidity, or vibrational stiffness, of the rotor 17 is increased by the careful placement of these planes of radial spokes which interconnect the cryogenic portion at various positions along the length of the rotor. The proper placement of these planes of spokes is determined by comparing the maximum deflection of the rotor portion 17 at the operational frequency against the maximum allowable deflection which can be tolerated under steady state conditions. Ideally, the cryogenic rotor portion 17 should be continuously interconnected along its length, but the cryogenic cooling requirement limits the number of spokes which may be employed. Therefore, there is a trade-off of cryogenic heat leakage against structural stiffness that must be made. Since within an order of magnitude the heat leakage of several planes of spokes does not affect the overall efficiency of the turbine generator, enough spokes may be connected in planar sets to provide the desired stiffness such that the operating speed of the rotor assembly lies approximately midway between the consecutive critical frequencies of the rotor, and in some cases, if enough planar sets are added, the critical frequencies are shifted substantially away from the operating frequency so that the deflection at operating frequency is greatly reduced.

Figure 5:
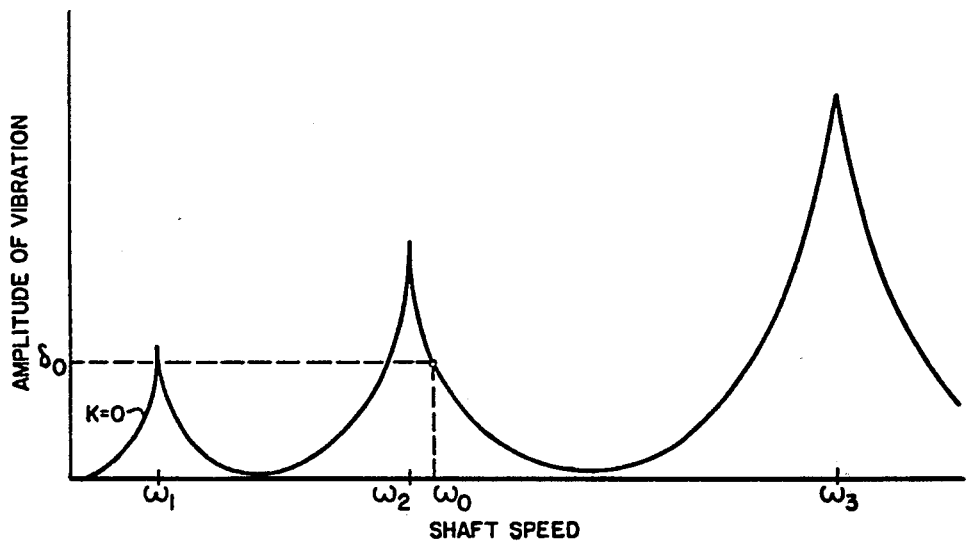
FIG. 5 is a graphical representation of amplitude vibration as a function of shaft speed for a rotor which is supported only at its end points; and, FIG. 6 is a graphical representation which shows the shifting influence of multiple planar sets of supporting spokes for the rotor assembly of FIG. 2.

The deflection of the rotor assembly at various frequencies is illustrated by the curves of FIG. 5. In FIG. 5 the amplitude of vibration is seen to peak at three critical frequencies, $\omega_1$, $\omega_2$, and $\omega_3$. While three critical speeds have been illustrated, the rotor assembly may have an infinite number more. Critical speeds up as far as the third and fourth mode are sometimes of importance, but for higher than that they are rarely of interest because they are very difficult to induce in practice. The operational speed $\omega_0$ of present two-pole generator rotors generally lies between the second and third critical speeds as illustrated in the FIG. 5. The figure $\delta_0$ represents the radial deflection of the rotor assembly 17 as it rotates at the operational speed of $\omega_0$. The deflection $\delta_0$ is typically greater than the maximum deflection which can be tolerated by the rotor assembly at rest. If the rotor is operated continuously at this deflection value its elastic property will be permanently strained and probably fractured if run for long at this particular speed. Thus it is desirable to shift the critical frequencies in a manner such that the operating frequency of the machine will lie intermediate of consecutive critical frequencies where the amplitude of radial deflection is radially small, and preferably the critical frequencies should be shifted far enough to the right so that operational speed may be achieved without passing through the first critical speed.

Figure 6:
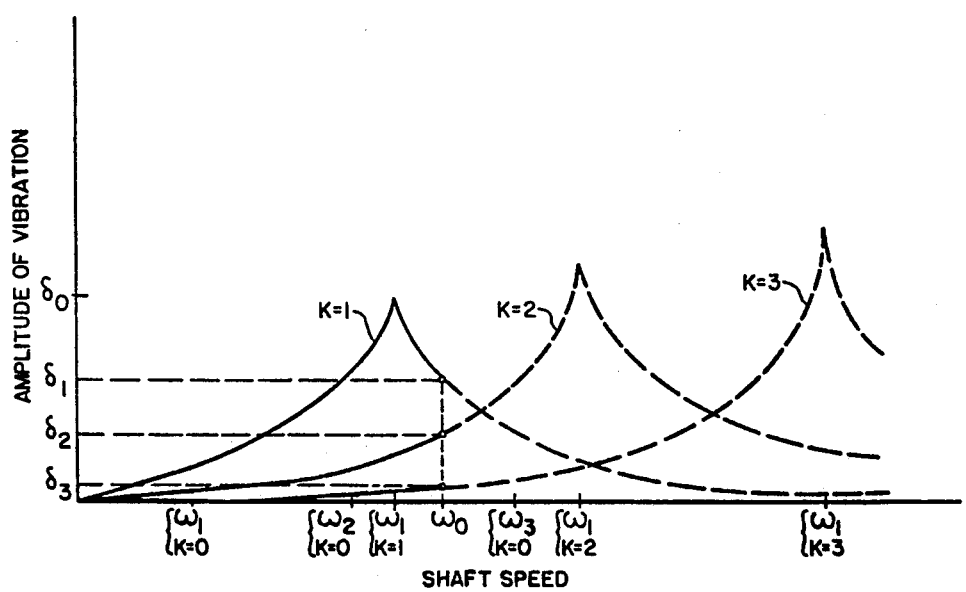

The shifting effect of one or more intermediate planar sets of supporting spokes 23 is illustrated in FIG. 6. Note that the radial deflections of the rotor assembly $\delta_1$, $\delta_2$, $\delta_3$ decrease as the number of sets of spokes increases. In particular, the first critical speed for one intermediate planar set of spokes (K=1) is shifted to the right toward the operating frequency $\omega_0$ which yields a radial deflection of $\delta_1$ which is typically less than $\delta_0$ of the conventional rotor structure but may in some cases still exceed the maximum deflection allowable under steady state conditions. In that case, multiple planar sets of supporting spokes are distributed along the axial length of the rotor member 17 to further shift the first critical speed to the right. For two intermediate planar sets of supporting spokes (K=2) the first critical speed $\omega_1$ is shifted past the operating speed $\omega_0$ and yields a radial deflection of $\delta_2$ which is substantially less than the radial deflection $\delta_0$ sustained by the conventional rotor assembly and also less than the radial deflection $\delta_1$. The radial deflection is greatly minimized by three intermediate planar supporting sets (K=3) wherein the first critical frequency is shifted substantially away from the operating frequency $\omega_0$. With three or more intermediate planar spoke sets (K=3) the first critical speed is shifted far enough away from the operating speed $\omega_0$ so that radial deflection of the rotor assembly is minimized and the rotor may be brought up to speed without passing through its first critical frequency.

Referring again to FIG. 3, a preferred embodiment of the cryogenic rotor portion 17 comprises the generally cylindrical inner core portion 44 in which a plurality of radially extending, circumferentially spaced slots 62 are disposed. A field winding 64 is wedged into the slots 62 in the same manner as in conventional generator rotors. The field winding 64 comprises a plurality of superconductors which are wound in a slot liner or filler that protects the winding ground insulation from the differential movements between the conductors and support structure. The winding 64 is provided with ground wall insulation for full winding voltage. Current insulation is provided by enamel insulation on each individual conductor.

Cooling ducts, (not shown) are wound into the coil. A suitable cooling duct arrangement is disclosed in the copending application Ser. No. 577,517, filed May 14, 1975, now U.S. Pat. No. 3,983,427, which is hereby incorporated by reference. These ducts provide discrete axial cooling paths through the winding for a liquid cryogen coolant and also provide a radial high thermal conductivity path that tends to offset the compressive heat rise in the winding.

The turns of the winding 64 are distributed in winding groups about the core 44 and are connected to define at least one magnetic pole pair. Lying intermediate of next adjacent winding groups are core pole portions 66, 68, 70 and 72. The core pole portions are provided with the radially extending openings 43 to accommodate the projection of the spokes 33. The additional opening 47 permits the entry of the other end of the support spoke 33 to its ball and socket connection 45 so that one end of the support spoke 33 is joined to the ambient temperature rotor portion 37 and extends completely through one side of the cryogenic temperature core portion 44 and is secured to the core member 44 at a point substantially diametrically opposite. It is desired to utilize at least four such spokes 33 for the two-pole (one-pole pair) winding configuration illustrated in order to achieve the desired precision and alignment of the inner cryogenic core portion 44 with the outer ambient temperature portion 15. However, it will be apparent that in a supporting arrangement utilizing two or more planar spoke sets, as few as two angularly displaced spokes per set may be employed to good advantage. Furthermore, in those rotor configurations designed for two or more pole-pairs (four or more magnetic poles) angular spacing arrangements other than the right angle displacement may be utilized between adjacent spokes in each set.

Figure 4:
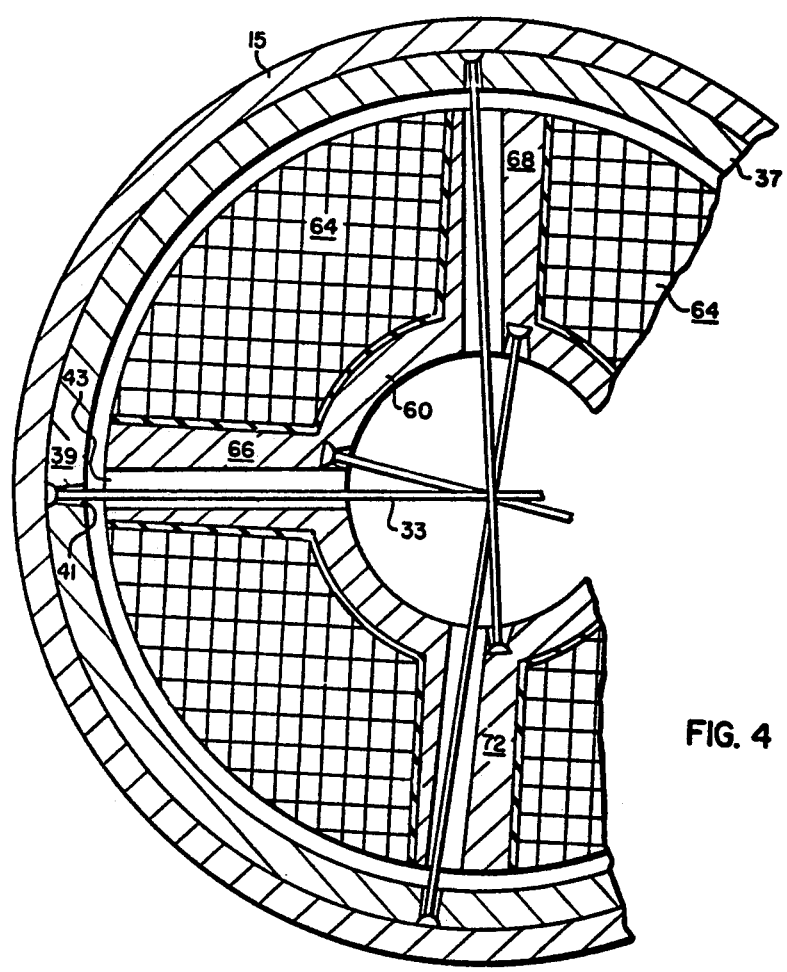
FIG. 4 is a partial cross-sectional view of a rotor assembly having salient poles.

FIG. 4 illustrates a typical supporting spoke arrangement for a two-pole (one-pole pair) salient pole rotor assembly. The spokes 33 may be skewed slightly with respect to each other but are more or less arranged in a manner similar to the spoke arrangement of FIG. 3. In this arrangement, the winding groups are not disposed within slots but are wound about the salient pole members 66, 68, 70 and 72. The salient pole members have radially extending openings 43 through which the support spokes 23 project and connect the inner cryogenic core rotor portion 44 with the outer ambient rotor portion 15 by means of ball and socket arrangements 39. The spokes 33 are preferably equipped with adjustable connecting means 50 for providing the proper tension and adjusting the position of the inner rotor member with respect to the outer rotor member.

It is desirable to exhaust the cryogenic cooling fluid through the pole openings 43 and over the spoke end portions 33, 35 so that the thermal loading of the multiple spokes is minimized. In the present invention a cryogenic cooling fluid, such as liquid helium, is introduced along the axis of the cryogenic rotor portion 17. It is distributed through the superconducting winding and through the radial openings 43 by the centrifugal pumping action of the rotor assembly as it rotates. The centrifuge action of the rotor drives the higher density coolant from the interior of the rotor radially outward and through the openings 43. The end portions 33, 35 of the spokes are cooled as the coolant circulates.

It should be understood that various modifications, changes and variations may be made in the arrangements, operations and details of construction of the element disclosed herein without departing from the spirit and scope of the present invention. The support arrangement disclosed herein may also have applicability outside that of electric machinery and may be utilized wherever it is necessary to support a cryogenic structure with respect to an ambient temperature structure.

We claim:

1. In a superconducting dynamoelectric machine having a rotor member including a generally cylindrical first rotor portion adapted for ambient temperature operation, a generally cylindrical second rotor portion adapted for cryogenic temperature operation concentrically disposed within said first rotor portion, said second rotor portion including a rotor core member and a superconducting winding, said winding being wound about said core member with portions of said core member disposed intermediate of next adjacent winding portions, the combination with said core member of a plurality of generally radially extending support spokes interconnecting said first and second rotor portions, said spokes projecting through said intermediate core member portions and being secured in tension between said first and second rotor portions, each of said spokes having one end portion connected to said first rotor portion and the opposite end portion connected to said core member, said spokes being displaced one from another along the axial length of said rotor member.

2. A superconducting dynamoelectric machine as defined in claim 1 including:
  a generally cylindrical support annulus connecting said first rotor portion to one end of said second rotor portion.

3. A superconducting dynamoelectric machine as defined in claim 1, said winding comprising a plurality of turns distributed in winding groups about said core, said winding groups defining at least one magnetic pole pair, said core member having pole portions disposed intermediate of next adjacent winding groups, said pole portions having radially extending openings through which said support spokes project.

4. A superconducting dynamoelectric machine as defined in claim 3, said core member being generally cylindrical and having a plurality of radially extending, circumferentially spaced slots within which said winding groups are disposed.

5. A superconducting dynamoelectric machine as defined in claim 3, wherein said intermediate core pole portions are salient poles and said winding is wound about said salient pole portions.

6. A superconducting dynamoelectric machine as defined in claim 1, said support spokes being arranged in a plurality of axially spaced sets, each set including a plurality of said spokes axially spaced one from another within each set, the axial spacing distance between support spokes within each set being small as compared to the axial spacing distance between said sets.

7. A superconducting dynamoelectric machine as defined in claim 6, at least one of said spokes within each said set being angularly displaced with respect to the remaining ones of said spokes of said set.

8. A superconducting dynamoelectric machine as defined in claim 1, wherein the ends of said support spokes are connected to said first rotor portion and to said core member by a ball and socket arrangement.

9. A superconducting dynamoelectric machine as defined in claim 1, wherein each of said support spokes comprises:
- a first spoke section;
- a second spoke section; and
- means for connecting said first and second spoke sections one to another to permit alignment of said second rotor portion with said first rotor portion and to provide a predetermined spoke tension.

* * * * *